(Specimens.)
D. L. DARAN.
METHOD OF AND MEANS FOR ORNAMENTING THE SURFACES OF WOOD, &c.
No. 317,317. Patented May 5, 1885.
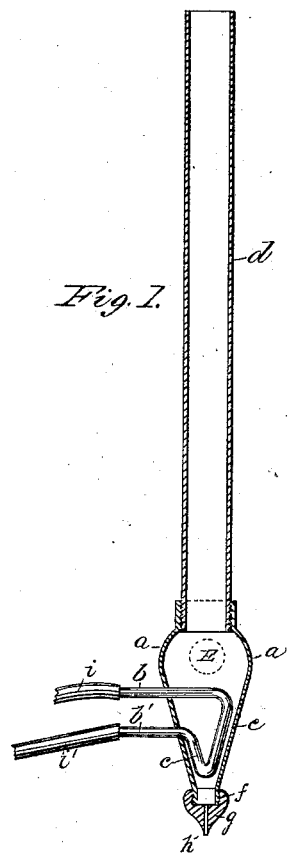
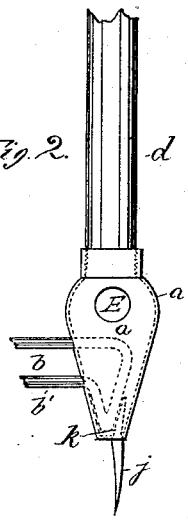
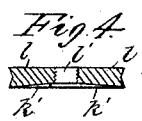
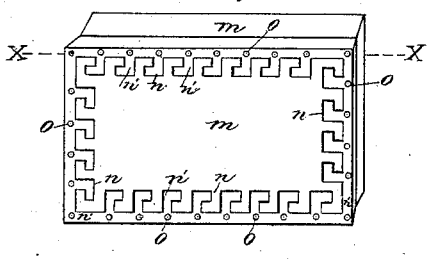
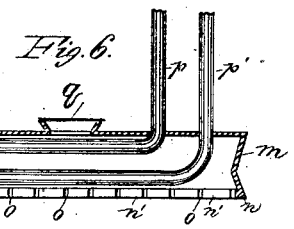
WITNESSES:
INVENTOR
Dominique L. Daran
BY Phillips Abbott
his ATTORNEY

UNITED STATES PATENT OFFICE.

DOMINIQUE LUCIEN DARAN, OF NEW YORK, N. Y., ASSIGNOR OF ONE-HALF TO LOUIS KELLER, OF SAME PLACE.

METHOD OF AND MEANS FOR ORNAMENTING THE SURFACES OF WOOD, &c.

SPECIFICATION forming part of Letters Patent No. 317,317, dated May 5, 1885.

Application filed May 10, 1883. (Specimens.)

*To all whom it may concern:*

Be it known that I, DOMINIQUE L. DARAN, a citizen of the Republic of France, and a resident of New York city, in the county of New York and State of New York, have invented a new and useful process for ornamenting the surfaces of wood, bone, ivory, metal, and other substances, and for preparing blocks or type from which printing and stamping may be done, and which may also be practiced in various other arts, and a new and useful apparatus whereby the said process may be practiced, of which the following is a specification.

Certain forms of the apparatus are shown in the accompanying drawings, in which Figure 1 illustrates a sectional view of the marking apparatus with pencil-tip attached. Fig. 2 illustrates a plan view of the marking apparatus with a pen-tip attached. Fig. 3 illustrates a face view of a matrix in the form of a daisy. Fig. 4 is a vertical section of the daisy-matrix shown in Fig. 3. Fig. 5 illustrates a face view of my invention embodied in the form of a block; and Fig. 6 is a vertical section of the block shown in Fig. 5 through the line $x\ x$ thereof.

My invention relates to the art wherein a raised portion or relief is produced on the surface of articles composed of wood, bone, ivory, metal, and other substances by the application of an acid or other chemical substance to the material, which eats away such portions thereof as are not protected from it, the protecting substance being usually wax or like substance not affected by the acid or other chemical substance used for eating or cutting away.

In Figs. 1 and 2 of the drawings, $a$ is what I will call the "head" of the marking apparatus. It is preferably made of metal, steel, iron, brass, copper, or any other suitable metal, and is preferably about the size and shape shown in these figures. It is hollow throughout its entire length, the cavity preferably contracting toward the bottom.

$b\ b'$ are two small pipes, which enter the sides of the head, the inner ends of which are connected by a small coil of tubing or a single loop of tubing, as desired. (Shown at $c$.)

$d$ is a handle of any suitable material, preferably wood or other non-conductor of heat, which is fastened to the upper end of the head in any desired manner.

E is an opening in the side of the head, near the upper end thereof. It may be provided with a cover or not, as desired. At the lower end of the head I provide screw-threads $f$.

$g$ represents one form of tip, fastened to the end of the head by the screw-threads $f$, and through it is made a small hole, $h$. This kind of tip I call the "pencil-tip." The hole through it is so small that wax or similar substance, when liquefied by heat, will feed through the hole by a kind of capillary attraction when the tip is brought in contact with the surface to be ornamented or engraved, but will not drop from it.

$i$ and $i'$ are two small and very flexible tubes, preferably made of rubber.

The operation of the apparatus as thus far described is as follows: The tube $i$ is connected with any suitable source from which a supply of steam, hot air, hot water, or heating medium is obtained, which heating medium is caused to pass through the coil or loop of tubing $c$, and in so doing it heats the head and passes out therefrom through the tube $b'$, and the tube $i$, the end of which is preferably placed in a vessel containing water, especially if steam or hot water be used as the heating medium, or allowed to discharge in the open air, or into an exhaust-pipe, as desired. Its function is simply to carry away the exhaust of the heating medium, thus maintaining circulation, and in such a manner that it will not interfere with the operations of the workman. The tubes $i$ and $i'$ should preferably be supported by a suitable rest above the table or bench on which the work is done, so that they will not brush across it as the workman operates. The exhaust-pipe $i'$ may be dispensed with, especially if such a heating medium as hot air is used. Sufficient heat must be supplied to keep the head $a$ and the tip on its end hot enough to liquefy the wax or other like substance and maintain it in a liquid condition, and for this purpose I carry the tube or coil $c$ as far down in the head as I can. The wax is supplied in little pellets or pieces, which are dropped through the opening E; or the handle may be hollow and the pellets dropped in at the end, as shown in Fig. 1. In this event there will be no necessity for the opening E. As soon as the wax reaches the inside of the head, it speedily melts, and becoming fluid flows downward through the hole $h$ in the tip, and the operator, holding the handle $d$ in his hand, uses the implement precisely as he would a pencil, resting the end of the tip against the substance which he desires to ornament or on which he desires to produce a relief, and thus draws or sketches such figure or writes such words as he may desire, the apparatus, however, leaving a line of wax, instead of lead, wherever it touches; but no pressure is required, as in the use of a pencil. The tubes $i$ and $i'$ being very flexible, unimpeded movement of the apparatus is secured, and it may be directed by the artist or operator at will. The tip $g$ may be made all in one piece with the rest of the head, if desired.

In order that the wax may be deposited in lines of differing width, I provide a tip like an ordinary nibbed pen, preferring, however, to have the point of the pen very short, the better to heat it to the extremity thereof. Such a tip is shown at $j$ in Fig. 2. The upper end of the pen should preferably touch the heating coil or loop, since, when so constructed, it is more perfectly heated. The melted wax passes down to the pen through the slit or hole $k$.

I have found that the wax may be deposited solid in the various forms and outlines—such, for instance, as that of a daisy—such deposit being made at a single operation by the use of a properly-constructed tip, which form of tip I will call "matrix," and such a matrix I have shown in Figs. 3 and 4, which represent a daisy. The outlines of the several leaves shown at $k'$ $k'$, are all in the same plane, or, in other words, so that when the matrix is laid on its face on a flat surface all the outlines $k'$ will touch such surface; but the metal within the outlines is cut away, leaving the matrix concave on its face, as shown in Figs. 3 and 4 at $l$.

$l'$ is the threaded hole in about the middle of the matrix, by which it is screwed to the end of the head $a$. When such matrix is used, the melted wax flows down from the head and fills the under concave surface thereof, and clings there in a liquid condition until it is brought in contact with the surface to be ornamented. This contact is effected in a line at substantially right angles to the surface, and is then removed in the same line, and in a moment thereafter the face of the matrix will become again filled with wax, and it can then be applied where the next figure is desired. The stems, branches, or twigs connecting the flowers, leaves, &c., may then be supplied with the pencil-tip or the pen-tip, as desired.

In Figs. 5 and 6 I show my invention embodied in the form of a block-matrix, whereby the wax may be deposited in a large and complicated design all at one operation.

$m$ is the block-matrix, preferably made of metal, and on the under surface thereof is produced any suitable design, the outlines whereof, $n$ $n$, are all in the same plane, and the interior portion (shown at $n$ $n$) are concave, as before described. Small holes extend from the interior of the matrix to these concave parts, as shown at $o$ $o$, through which the wax passes.

$p$ $p'$ are the tubes for the admission and emission of the heating medium.

$q$ is the opening for supplying the wax. The operation of this matrix is the same as that of the tips shown in Figs. 3 and 4.

This form of my invention is specially applicable where it is desired to ornament a considerable number of articles with the same design or pattern—such, for instance, as the front plate for locks, escutcheons, &c.

My invention may also be embodied in the form of a cylinder revolving upon centers, a suitable heating appliance entering through the centers, and the melted wax supplied to the surface of the cylinder through perforations from the inside to the outside thereof, the same as in the block-matrix shown in Figs. 5 and 6.

It will be understood that, when the outline of a figure or design has been traced with the wax-applying pencil or pen, the central part, or that which is inclosed by the outline, can be filled in solid or partly solid, as desired, by repeated strokes of the pen or pencil; or the wax may be supplied to the inclosed space by pouring or dipping from any suitable receptacle containing it in a liquid state. After the wax has been applied to the surface of the material, it is submerged in a bath of any suitable acid or other suitable substance, or succeeding baths of different acids or other substances, for the purpose of cutting or eating away the parts not protected by the wax, in a manner already well known. After being immersed a suitable time, remove the material, wash it in fresh cold water, if desired to retain the wax for another immersion, until the acid and char are all removed; or, if desired to remove the wax, hot water and a stiff brush are all that are required. The hot water will melt the wax and the brush removes it and the char, and in order to remove all acid effect whatever I prefer to immerse the article in a bath of alkali or other substance, which will neutralize the effect of the acid or material used to do the cutting.

Prior to my invention it has been customary in this art to entirely cover the surface to be operated upon with a coating or film of wax or other like substance or compound, and then to remove the same at such places as it was desired the acid should act upon; but when this was done one of two difficulties was encountered. If the covering of wax or like substance or compound was applied cold, then there was imperfect contact between the surface and the wax, so that the acid in places would penetrate beneath the wax and cut away the surface where not wanted, and even where the contact was good there was no penetration by the wax into the pores or fibers of the material, so that the acid would undercut; and if the wax or like substance or compound was applied hot, then it penetrated the pores or fibers and unevennesses of the material, and could not be sufficiently removed to insure the action of the acid. For this reason, to the best of my knowledge, this art has not been successfully practiced on porous or fibrous substances, nor on surfaces which were at all rough.

Prior to my invention, also, fluid greasy inks and compounds of wax, gum, and other such substances, dissolved in suitable solvents, and thus constituting permanent liquids—as thin oil is a liquid—have been used as "protectors," and such substances have been applied as such protectors to the specific parts only of the article being treated which were not to be affected by the acid; but such substances have not been practically successful on porous articles—such, for instance, as wood—because, being, as stated, normally liquid, they required a long time to dry, and thus while drying they not only penetrated the article, but also spread laterally in it after the manner of a blot of ink in blotting-paper, thus making it impossible to produce, in porous materials at least, fine lines or delicate work. By my invention, however, the wax or other substance used as the protecting agent is normally in the condition of a solid, and is rendered liquid by the application of heat thereto. Thus the moment it comes in contact with the comparatively cold surface of the article being operated upon it begins to cool on the surface, and almost immediately becomes solid. Thus, although penetration into the surface of porous substances is attained to a certain extent, still lateral spreading is practically avoided, and the whole of the protecting substance applied becomes hard almost as soon as it has been applied. Thus obliteration or smearing, which would frequently occur with the use of greasy ink or other normally-liquid substance, is avoided. Moreover, I apply my protecting substance to the identical parts only which I wish to be protected, and to no other parts. Thus all the parts not covered by the protecting substance are left perfectly exposed to the action of the acid. I do not, however, limit myself to a protecting material which must be made liquid by heat before it can be applied, because a suitable quickly-solidifying substance or compound may be prepared without the use of heat, which will answer the purpose, and by the use of which the advantages of my invention may be realized.

Another part of my improved process is as follows: Prior to applying the wax or other like substance or compound, I color the entire surface of the article to be treated with any stain or coloring material which may be desired, care being taken that such material will not interfere with the action of the acids. I then apply the wax or other like substance or compound to the surface, as before described, and then submit it to the action of the acid. Thus, after the acid and the wax have been removed, the surface of the relief or ornamentation will appear in the color given it by the stain or coloring material used, and, if desired, the acid may be removed by washing in pure cold water, as before stated, without disturbing the wax, and then the article be treated by the application of a different-colored stain or coloring material, which affect those parts only which have been acted on by the acid, the other parts being protected by the wax. Thus, when the wax is finally removed, the relief will appear in one color and the sunken parts in a different color, and the acid need not be washed out if the coloring material which is last applied will not be affected by it. I prefer, however, to remove the acid.

The following preparations of wax I have found very suitable: Equal parts of yellow beeswax and a good quality of resin melted together and strained through fine silk, then formed into the pellets or small pieces. I have also found that ordinary unrefined paraffine acts well in my apparatus. I also find it advantageous at times to mix with or substitute for the wax other substances—such as resin, paraffine, bitumen, coal-tar, &c.—the reason for such admixture or substitution being that some kinds of work require a great degree of fluidity; also, some work requires more rapid hardening, other work requires deeper penetration of the wax-like compound because of porosity, and some of the above compounds will withstand the effect of the acid longer than others, thereby permitting a longer immerson in the acid bath to produce a greater relief. I do not therefore limit myself to wax alone or in composition, although for the sake of brevity I have frequently used that word to designate the protecting material; nor do I limit myself to the specified details of construction of the apparatus above described, since they may be considerably altered from those shown and still embody my invention.

Having described my invention, I claim—

1. The described process of producing raised surfaces or reliefs, consisting in tracing, drawing, or writing the desired relief with wax or other suitable quickly-solidifying substance in liquid state on the surface to be ornamented, and then subjecting the same to the action of an acid bath, substantially as set forth.

2. The described process of producing raised surfaces or reliefs, consisting in first depressing the desired relief in or cutting it out from the surface of a matrix in which the outlines of the relief are raised and all on the same plane, then filling the space within the outline with melted wax or analogous material, and then applying it while melted to the surface to be ornamented, and then submitting the surface to be ornamented to the action of an acid bath, as and for the purposes set forth.

3. The described process of applying a protecting-coating of wax or like substance to any desired surface, consisting in melting the wax in a movable receptacle in which it is maintained in a melted condition by a continuous application of heat thereto and applying it to the surface desired to be protected by bringing the receptacle in contact with such surface, as set forth, and for the purposes described.

4. The combination of the head $a$, provided with a small aperture at the lower end, through which the melted wax or like substance can pass, and means for heating the head and an opening therein for the admission of the wax, substantially as and for the purposes set forth.

5. The combination of the head $a$, provided with an opening at its lower end, and also provided with means whereby it may be continuously heated, an aperture therein for the admission of the wax, and a matrix attached to the lower end thereof on the face of which is formed the outline of a figure, all the outlines being elevated and in the same plane and the space within the outlines being made concave, such concave part communicating with the interior of the head $a$, substantially as and for the purposes set forth.

6. The combination of the block-matrix $m$, cylindrical or flat, provided with the raised figure $n$, the depressed portion $n'$, the holes $o$, and means for continuously heating the matrix, and an aperture therein for supplying the wax or like substance, substantially as and for the purposes set forth.

7. The combination of the hollow handle $d$, the head $a$, the heating-tubes $b$, $b'$, and $c$, the connecting-pipe I, the tip $g$, and the aperture $h$, all substantially as and for the purposes set forth.

8. The combination of the head $a$, the heating-tubes $b$, $b'$, and $c$, the pipe $i$, the opening $k$, and the pen $j$, substantially as and for the purposes set forth.

9. The described matrix or tip provided with the raised outline $k'$, the depressed or concave part $l$ within the outline, and the hole $l'$, for the passage of the melted wax, substantially as and for the purposes set forth.

10. The described process of ornamenting porous or fibrous articles by producing a relief thereon, consisting in applying to such parts thereof only as are to be left in relief a protecting-coat of any substance in a hot and liquid state, which will neutralize the effect of the acid, and then subjecting the article to the action of an acid bath until the parts not protected have been sufficiently eaten away by the acid, substantially as set forth.

11. The described process of ornamenting articles by producing thereon a colored relief, consisting in first coloring the surface of the article to be ornamented with any desired color which will not interfere with the action of the acid, then applying to such parts of the colored surface only as are desired to form the relief a protecting-coat of material which will neutralize the effect of the acid, then submitting the article thus colored and protected to the action of the acid until the parts not protected by the coating of neutralizing material have been sufficiently eaten away by the acid, and then removing the acid and the protecting material, substantially as set forth.

12. The described process of ornamenting articles by producing a relief thereon, the surface of which relief shall be of a different color from the recessed spaces surrounding the same, consisting in first coloring the surface of the article to be ornamented with any desired coloring matter or substance which will not interfere with the action of the acid, then applying to such parts only of the colored surface as are desired to form the relief a protecting-coating of material which will neutralize the effect of the acid, then submitting the article thus colored and protected to the action of the acid until the parts not protected have been sufficiently eaten away by the acid, then before removing the protecting material coloring the recesses eaten out by the acids with a different color or shade of color from that with which the surface of the article was first colored, and then removing the protecting material, substantially as set forth.

13. The described process of ornamenting articles by producing thereon a colored relief, consisting in applying coloring-matter to the entire surface of the article, then applying protecting material to such parts of the surface as are to form the relief, and then subjecting the article thus colored and protected to the action of an acid bath, substantially as and for the purposes set forth.

14. The described process of ornamenting articles by producing thereon a colored relief, the recesses surrounding the relief being colored differently from the relief, consisting in coloring the entire surface of the article with the color desired to be on the surface of the relief, then applying protecting material to such parts of the surface of the article thus colored as are to form the relief, then submitting the article thus colored and protected to the action of an acid bath, then coloring the parts eaten away by the acid with a different color or shade of color from that first applied to the article, substantially as and for the purposes set forth.

Signed at New York, in the county of New York and State of New York, this 26th day of April, A. D. 1883.

DOMINIQUE LUCIEN DARAN.

Witnesses:
LOUIS KELLER,
JOHN M. HARRINGTON.